(12) United States Patent
Jeong

(10) Patent No.: US 8,556,088 B2
(45) Date of Patent: Oct. 15, 2013

(54) NANOPOROUS OXIDE CERAMIC MEMBRANES OF TUBULAR AND HOLLOW FIBER SHAPE AND METHOD OF MAKING THE SAME

(71) Applicant: Dae Yeong Jeong, Changwon-si (KR)

(72) Inventor: Dae Yeong Jeong, Changwon-si (KR)

(73) Assignee: Korea Electrotechnology Research Institute (KR)

( * ) Notice: Subject to any disclaimer, the term of this patent is extended or adjusted under 35 U.S.C. 154(b) by 0 days.

(21) Appl. No.: 13/623,246

(22) Filed: Sep. 20, 2012

(65) Prior Publication Data

US 2013/0015073 A1 Jan. 17, 2013

Related U.S. Application Data

(62) Division of application No. 13/226,634, filed on Sep. 7, 2011, which is a division of application No. 12/269,649, filed on Nov. 12, 2008, now abandoned.

(51) Int. Cl.
| | |
|---|---|
| *C25D 11/02* | (2006.01) |
| *C25D 11/04* | (2006.01) |
| *C25D 11/34* | (2006.01) |
| *B01D 69/08* | (2006.01) |
| *B01D 69/04* | (2006.01) |
| *B01D 39/14* | (2006.01) |

(52) U.S. Cl.
USPC ............... 210/500.25; 210/500.23; 210/506; 210/651; 210/653; 148/518; 205/324; 205/328; 205/322; 204/489; 204/492; 204/493

(58) Field of Classification Search
USPC ............ 210/500.23, 500.25, 506, 650–653; 205/199–201, 322–332; 204/489, 492, 204/493; 148/518
See application file for complete search history.

(56) References Cited

U.S. PATENT DOCUMENTS

| | | | | |
|---|---|---|---|---|
| 4,859,288 A | * | 8/1989 | Furneaux et al. | 205/75 |
| 5,693,210 A | * | 12/1997 | Tomita et al. | 205/324 |
| 2003/0047505 A1 | * | 3/2003 | Grimes et al. | 210/483 |
| 2003/0134176 A1 | * | 7/2003 | Sarkar | 429/40 |
| 2005/0065028 A1 | * | 3/2005 | Pellin et al. | 502/527.24 |
| 2005/0224360 A1 | * | 10/2005 | Varghese et al. | 205/171 |
| 2008/0006574 A1 | * | 1/2008 | Ramaswamy et al. | 210/490 |
| 2009/0050564 A1 | * | 2/2009 | Hatanaka | 210/650 |

OTHER PUBLICATIONS

Itoh et al., Strengthened porous alumina membrane tube prepared by means of internal anodic oxidation, 1998, Elsevier, Microporous and Mesoporous Materials, 20, pp. 333-337.*
Definition of "heat sink", Merriam-Webster Online Dictionary, pp. 1-4.*

* cited by examiner

*Primary Examiner* — David C Mellon
(74) *Attorney, Agent, or Firm* — Park & Associates IP Law, P.C.

(57) ABSTRACT

The present invention is aimed to fabricate nanoporous anodic oxide ceramic membrane tubes with excellent pore characteristics by anodizing metal tubes located in a cylindrical symmetry with respect to a cathode which itself has a cylindrical symmetry. The membrane tubes may have protruded portions acting as supports and joints. The present invention also deals with stacks and bundles consisted of numbers of the anodic oxide ceramic tubes for filter and dialysis applications.

7 Claims, 9 Drawing Sheets

NANOPOROUS OXIDE CERAMIC MEMBRANES OF TUBULAR AND HOLLOW FIBER SHAPE AND METHOD OF MAKING THE SAME

REFERENCE TO RELATED APPLICATIONS

This is a divisional of pending U.S. patent application Ser. No. 13/226,634 filed on Sep. 7, 2011 which is a divisional of U.S. patent application Ser. No. 12/269,649 filed on Nov. 12, 2008 and abandoned then, the entire contents of which are incorporated herein by reference.

FIELD OF THE INVENTION

This invention relates to membranes useful in filtration and dialysis processes, and more specifically, the present invention is concerned with nanoporous oxide ceramic membranes of tubular and hollow fiber shape, and methods of fabricating them.

BACKGROUND OF THE INVENTION

Nanoporous anodic oxide ceramic membranes such as aluminum oxide, titanium oxide, etc. are of interest for various applications, such as filters, gas sensors, catalysis, hemodialysis, electro dialysis, fuel cells, templates for nanostructures, life science and biomedical applications, and so on. Different from other ceramic membranes, they have through-hole pores of uniform size, so that they can effectively and efficiently filter harmful particles smaller than the pore sizes without significant fouling, which is one of the serious problems which occurs when using conventional porous membranes with tortuous pore channels of wide distributions in size, and thus can be used for much longer than conventional ones without frequent cleaning the pore channel. Furthermore, their pore size can be controlled from several to several hundred nanometers, so that the selectivity in filtering of the filter incorporating the membranes is likely very excellent.

The pore size of nanoporous anodic aluminum oxide membranes can be controlled by selecting an electrolyte among sulfuric acid, phosphoric acid, oxalic acid, malonic acid, tartaric acid, citric acid and a mixture of sulfuric and oxalic acids, and applying the voltage specifically corresponding to the electrolyte. The pores can be self-ordered in an array of a close-packed structure by a two-step anodization process. Or the pore can be forced to be well-ordered by using imprints where nanoscale lattice patterns of convex features are present.

It has been known that as the melting point of the nanoporous anodic aluminum oxide is 1,000° C., it is estimated that they can be used up to 600° C. However, after heat treatment in high temperatures for phase conversion to crystalline forms, they can be used in high temperatures up to 1,000° C. The transformed ones are chemically very stable so that they can be used even in severe alkaline and acidic circumstances. That means that they can be used in ultrafiltration, nanofiltration and reverse osmosis in severely adverse acidic and alkaline environmental conditions at very high temperatures. Also nanoporous anodic aluminum oxide membranes are compatible with human organisms so that their application in life science including hemodialysis where fouling is a very severe problem, is of much attention. Furthermore, coating of layers being capable of adsorbing harmful gas, catalytic layers or layers with special functionality on pore walls and the surfaces of the membranes facilitates the membranes to be used as filters and sensors with very excellent performance. So the importance of nanoporous anodic aluminum oxide membranes in filter and sensor applications has become progressively large.

Nanoporous anodic titanium oxide membranes of different pore size can be made by using similar anodization methods with those for alumina ones, except that different electrolyte may be used. The electrolyte may comprise HF, KF, NaF, and a mixed solution of $H_2SO_4$ and HF, $CrO_3$ and HF, $(NH_4)_2SO_4$ and $NH_4F$, and $(NH_4)_2SO_4$ and NaF. The wall thickness of titanium oxide anodized is generally independent of the duration of the anodizing process.

As titanium oxide also shows excellent chemical resistance, it can be used in severe alkaline and acidic atmosphere. Its three crystalline phases, anatase, rutile and brookite, shows photo-catalytic activity so that nanoporous titanium oxide membranes can be used as filters decomposing environmentally harmful gases like VOC, $NO_x$, $SO_x$, etc., without depositing any other catalytic materials on its surfaces and pores. Furthermore, its high melting temperature of 1870° C. allows nanoporous titania membranes to be used in high temperatures. Therefore they can be used in severely acidic and alkaline environmental conditions in very high temperatures.

To date, only film-type flat anodic alumina or titania membrane plates of high quality have been fabricated. By the way, application of such plates is restricted to just a few fields, due to their relatively small filtering area. Most filter application requires the membranes of tube form which are of a larger filtering area and thus offer high filtering efficiency. Even hollow fiber membranes have been used for much higher efficiency, and they have been used even in hemodialysis which needs a short filtration time as possible. Such hollow fiber membranes, however, have been made only by using polymer-based materials. Up to now porous ceramic membrane tubes have been fabricated using conventional methods like sol-gel process based slip-casting. However, their pore characteristic is not good as in anodic oxide ceramic membranes. Accordingly, the advent of nanoporous anodic oxide ceramic membranes of tubular and hollow fiber shapes with excellent pore characteristic will remove all the disadvantages resulting from the flat and plate shape, and accelerate their practical applications to many fields. However, there have been no reports of making nanoporous anodic oxide ceramic membrane tubes with excellent pore characteristic.

High quality anodic oxide ceramic membranes with excellent pore characteristic are ones where close-packed through-hole pores of uniform size are well-arranged in an ordered manner and the porosity is high. For the fabrication of such high quality ones, by the way, special care must be paid for uniform electric field distribution between anode and cathode, excellent heat release capability from anode during anodization, uniform flow pattern of electrolyte, especially near the surface of metal to be anodized, and so on. Achievement of such requirements is relatively easy when plates are anodized, but not easy when metal tubes are anodized. So high quality anodic ceramic plates have been successfully fabricated by anodizing high purity aluminum or titanium plates using an anodization apparatus of relatively simple configuration, which satisfies the requirements mentioned above. However, it is likely that satisfaction of such requirements for tubes is not simple and easy. So few try has been made to fabricate anodic oxide ceramic membrane tubes.

The present invention shows that such requirements can be fulfilled in a relatively simple manner with fabrication methods incorporating cylindrical symmetry in arrangement of anode and cathode which themselves have a form of cylindrical symmetry, as well as some supplements according to such configuration.

SUMMARY OF THE INVENTION

The present article presents methods to fabricate nanoporous anodic oxide ceramic membrane tubes and hollow fibers with excellent pore characteristic, which were not available up to now.

The present invention provides nanoporous anodic aluminum oxide and titanium oxide membranes of tubular and hollow fiber shape, which are of very high efficiency by virtue of overcoming disadvantages resulting from the flat shape of nanoporous anodic oxide membrane plates, and has an object to provide fabrication methods of the nanoporous oxide ceramic membranes of tubular and hollow fiber shape.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

A simple way of making tubular porous oxide ceramic membranes is anodizing their corresponding metal tubes which are fabricated in a metal tube shape in advance. The metal tubes can be made by machining their ingots and then mechanically working them to be like the drawings. The dimensions can be changed greatly depending on the size of the filter. The diameter can be large as several ten meters and also small as several ten microns. The tubes with diameters less than a hundred microns can be called hollow fibers. As the hollow fiber is one of the tubes with very small diameter, it will be included in tubes hereafter. However, very thick membranes are not desirable, because making them requires very long anodization time, and this is especially so in the case of mild anodization of aluminum in which the anodization occurs very slowly.

In the case of anodic alumina membranes, a thickness less than 500 μm will be desirable. Thicknesses of 200~300 μm may be optimal in point of mechanical strength view for through-hole pore membranes for which 2 hours will be sufficient for generating the thickness in the case of a new generation of hard anodization. However, thicknesses less than 20 μm should be avoided due to their poor mechanical properties. It has been known that handling membranes thinner than 20 μm needs special attention.

The present invention suggests two ways of anodizing the metal tubes by using a cylindrical symmetry in arrangement of anode and cathode which themselves are form of cylindrical symmetry, depending on the surface anodized. One is that of anodizing the outer wall surface of the metal tube or hollow fiber. The oxide membrane and thus pore channel will grow inward from the outer wall surface until the inner wall surface is finally anodized. Another is that of anodizing its inner wall surface. In the latter, the oxide membrane and thus the pore channel will grow outward from the inner wall surface until the outer wall surface is finally anodized. In principle, the present invention is for uniformly anodizing metal tubes, and thus sets a cylindrical symmetry between anode and cathode, which themselves have a form of cylindrical symmetry. So it is expected that such configuration of anode and cathode results in uniform electric field distribution between them, and thus uniform distribution of closed-packed pore arrangement. Also by letting a wall surface of the metal tube be in an excellent thermal contact with heat sink and thus letting pores grow in a direction, in the present invention, formation of discontinuity in pore channels is avoided, which appeared in the case of through-thickness anodization where both wall surfaces of the metal tube are anodized.

Figure 1:
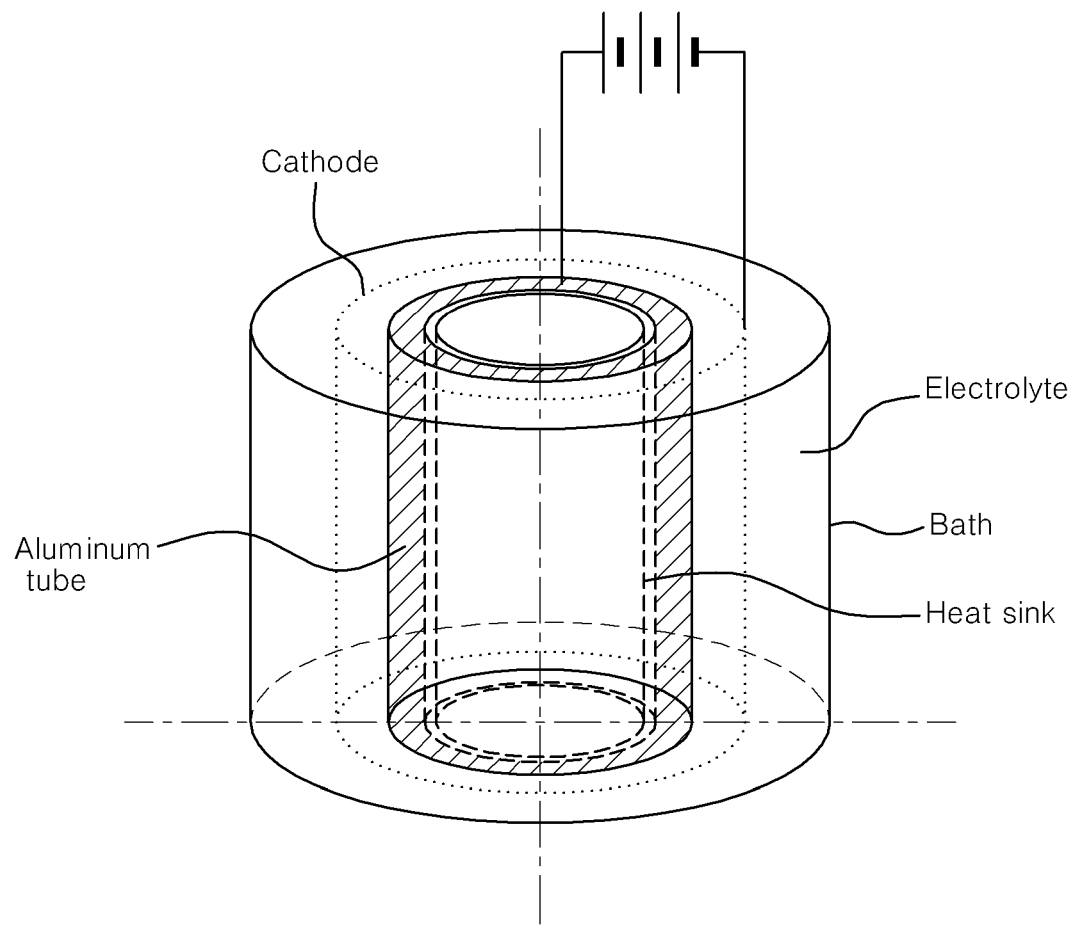
FIG. 1 shows a schematic set-up for fabricating tubular nanoporous oxide ceramic membranes, in which the outer surface of aluminum or titanium metal tube is anodized and the nanopores are grown inward.

FIG. 1 shows a schematic set-up of an apparatus for anodizing the outer wall surface of metal tube. In this set-up, the metal tube which is an anode is located in the center of an electrochemical cell for anodization. To maintain a uniform electrical field between the anode and the cathode, the cathode of cylindrical mesh or other similar shapes with a cylindrical symmetry is located in a cylindrical symmetry outside the metal tube to be anodized. The inner wall surface of metal tube should be in close contact with a heat sink in order to sufficiently absorb heat generated during anodization and to make the anodization process proceed in a steady state. Only the outer wall surface of the metal tube is in contact with the electrolyte, and is anodized. In some cases in which volume expansion due to anodization may hinder ultimately close contact between the inner wall of metal tube and heat sink, electrolyte may act as a conducting path of heat to heat sink. Also the inner wall surface should be in good electrical contact with the electrode so that the hollow cylinder is anodized thoroughly up to the inner wall surface. An extra metal layer will be necessary to protect surfaces of the electrode and the heat sink from over-anodization over the inner wall surface of metal tube. The electrolyte is stirred for uniform concentration. The nanopores are grown inward.

The processing parameters for anodization such as applied voltage, kind of electrolyte and anodization temperature will be changed, basically depending on the type of anodization and the desired interpore distance and degree of pore (i.e., cell) arrangement. Of course, the interpore distance will be dependent primarily on applied voltage, and secondarily on current and temperature.

The membrane thickness anodized depends on anodizing time. The membrane can be made by anodizing the metal tube to a certain depth inward, and then by removing the remaining aluminum matrix by using acidic solutions like a mixed solution of $CuCl_2$ and $HCl$, or detaching it from the remaining metal matrix by applying a few times a voltage pulse. Or it can be made by anodizing the tube thoroughly up to the inner wall surface. The resulting pores will be through-hole pores. The thickness can be controlled by controlling the anodizing time for the former method, and by controlling the thickness of the tube for the latter method. The diameter of the tube can be changed from several ten meters to several ten microns, so that even hollow fiber membranes can be fabricated by using this set-up.

Figure 2:
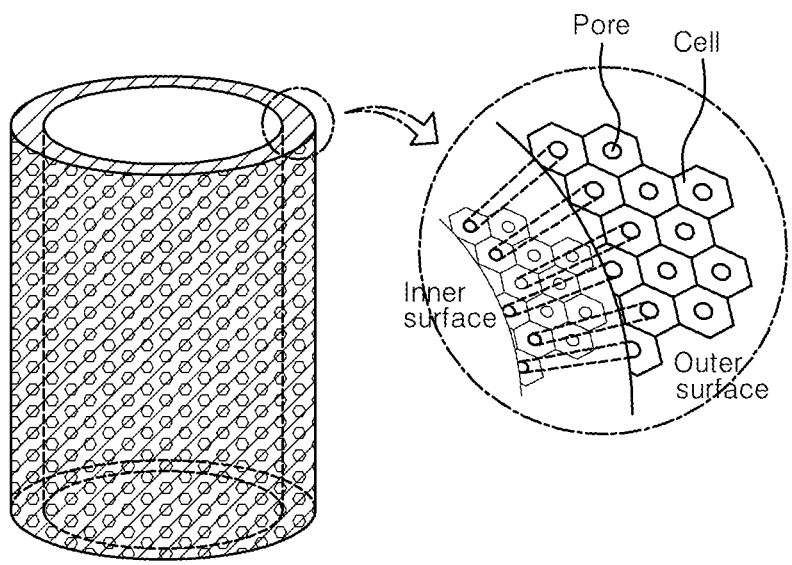
FIG. 2 shows schematic drawing of a tubular nanoporous anodic alumina or titania membrane fabricated by using the fabrication set-up shown in FIG. 1, in which the inset is exaggerated for emphasizing the difference in pore diameter between the inner and outer walls, which can appear in such tubular membranes.

In a certain condition of fabrication parameters, by the way, it is expected that the interpore distance, i.e. the cell size, between inner and outer surfaces be slightly different, due to the difference in area between the inner and outer wall surfaces, where the cells are close-packed. The interpore distance and the metal oxide cell size in the outer wall surface are expected to be slightly larger than those in the inner wall surface, due to larger area of outer surface, as shown in the insert of FIG. 2. The membranes with uniform through-hole pores, whose diameter can be controlled from several to several hundred nanometers, can be fabricated by selecting the corresponding electrolyte and applied voltage, and additionally treating them in acidic solution like $H_3PO_4$ solution for pore widening.

Figure 3:
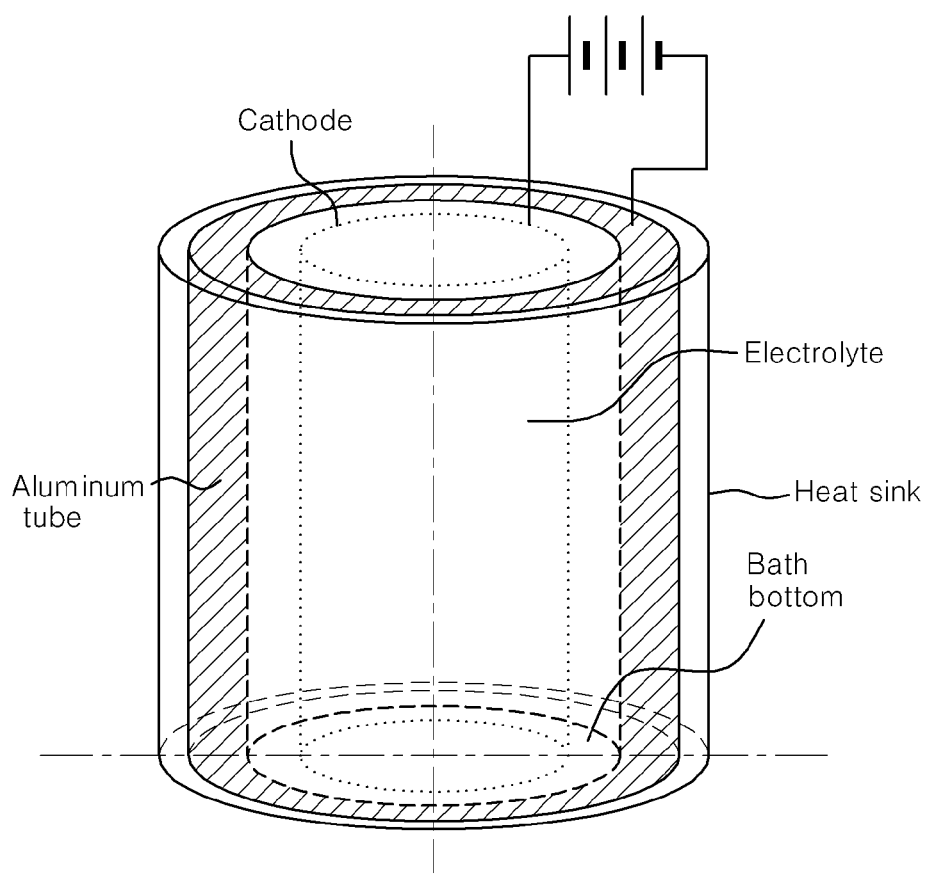
FIG. 3 shows another schematic set up for fabricating tubular alumina or titania membranes, in which the inner surface of the aluminum or titanium tube is anodized and the nanopores are grown outward from the inner wall.

FIG. 3 shows another schematic set-up for fabricating nanoporous anodic oxide ceramic membrane tubes by anodizing the inner wall surface. In this set-up, the electrolyte is contained inside the metal tube. To maintain uniform electrical field between anode and cathode, the cathode which has a shape of cylindrical symmetry like a hollow cylinder mesh or a wire string is located at the center inside the metal tube to be anodized. As the electrolyte container in this figure has a circular symmetry, it is expected that stirring under this configuration results in more uniform concentration than the set-up shown in FIG. 1 does. The outer wall surface of the metal tube should be in thermal contact with a heat sink in order to sufficiently absorb heat generated during anodization and to make the anodization process proceed in a steady state. The set-up of FIG. 3 is expected to be more thermodynamically stable than that of FIG. 1, because that of FIG. 3 offers a wider thermal contact area than does that of FIG. 1. It is worthwhile to notice, however, that electrolyte contained in this set-up may be limited to very small quantity in the case of tubes with very small diameter. In some cases in which volume expansion due to anodization may hinder ultimately close contact between the outer wall of the tube and heat sink, electrolyte may act as a conducting path of heat to heat sink. When the diameter of the tube is extremely small, the quantity of electrolyte contained inside the tube is also extremely small and the heat conduction through the electrolyte may not be sufficient for cooling the tube for the steady-state anodization. In this case, rapid circulation of electrolyte with regulated concentration and temperature is needed.

The anodization starts from the inner wall surface of tube, and thus pores are grown outward. In this set-up, the outer wall surface should be in contact with the electrode so that the tube is anodized thoroughly up to the outer wall surface. In the oxide ceramic membranes obtained by anodizing using the set-up shown in FIG. 3, the interpore distance and the metal oxide cell size in the outer wall surface is also expected slightly larger than those in the inner wall surface, due to a larger area of the outer surface, as shown in the insert of FIG. 2.

By the way, as the mechanical properties of anodic oxide ceramic membranes are very poor, the membrane tubes need mechanical support. Also as mechanical stress due to lattice expansion resulting from the transformation of metal to metal oxide may be high, the size of the anodic oxide ceramic membranes tube may be restricted. In order to make mechanically strong ceramic membrane tubes, therefore, it is necessary to selectively anodize some portions of the metal tube, but not all of them, patterned in some manner by some means. Then the rest of the un-anodized metal may be used as supports strengthening its mechanical properties and/or joints connecting it to neighboring structures.

A tremendously large numbers of applications exist for tubular nanoporous oxide ceramic membranes. The pore size of the membranes makes them suited to ultrafiltration and nanofiltration applications. Their highly uniform pore diameter allows for excellent selectivity in filtering, and their through-hole pores are free from severe fouling and there is a very low pressure drop therethrough. So they can be used with a very high efficiency and a long life cycle, even in applications such as hemodialysis in which fouling is severe when conventional polymer filters with tortuous nanopores are used. Because they are chemically inert to many reagents and also are stable at high temperature like 900° C., they can be chemically cleaned or burned for cleaning the pores when they become fouled. For example, they are inert to strongly acidic and alkaline solutions which cannot be used to clean fouled polymeric membranes. Their thermal stability makes them suitable for a variety of high temperature filtration applications, the need for which cannot be addressed by polymer membranes.

The following are examples of fabricating nanoporous anodic oxide ceramic membranes of tubular and hollow fiber shape by using the fabrication set-up shown in FIGS. 1 and 3, and of assembly consisted of numbers of such membrane tubes for applications:

Example 1

An aluminum ingot with a purity of 99.9% or a lower grade like 95.0% were prepared and machined to a hollow cylinder with a 100 mm inner diameter, a 120 mm outer diameter and 500 mm in length. The hollow cylinder was drawn to a tube of 10 mm inner diameter, 11 mm outer diameter and 5000 mm long, cut into 100 mm long pieces and electropolished to a fine surface. Some parts at both ends of the tube piece which would be used as a support were covered with a coat to prevent the portion from being anodized.

Then the tube was anodized using a two-step anodization process as follows: The tube was immersed in a sulfuric acid ($H_2SO_4$) solution at 1° C. of the anodization apparatus shown in FIG. 1 or 3, and anodized at 40 V for 15 hr. For the process, an electrolyte such as phosphoric acid, oxalic acid, malonic acid, tartaric acid, citric acid, a mixture of sulfuric and oxalic acids and a mixture of organic acids could be used with its corresponding voltage to generate self-ordering of pore channels, depending on the desired interpore distance. The anodized layer was etched out by immersing the tube in phosphoric acid for 5 hr, to prepare a seed for the second anodization. Sometimes the seed was prepared by pressing an imprint which has a well-ordered nanoscale convex pattern onto the surface of aluminum tube, without performing the anodization.

Then the etched or imprinted tube was anodized at the same voltage for a few hours to several days until the surface in the opposite wall was finally anodized and thus through-hole pores were formed through the wall.

In the case where the aluminum tube was not fully anodized, i.e., in the case that some thickness of aluminum was left un-anodized, the unreacted part was eliminated by immersing the anodized body in a mixed solution of $CuCl_2$ and HCl for several ten minutes, or by applying a voltage higher by 20 V than the final anodization voltage. The oxide barrier layer which appeared after removal of the unreacted aluminum layer was eliminated by immersing the anodized tube in a phosphoric acid solution for 30 min.

Then the coat at both ends of the tube was mechanically or chemically removed. The nanoporous anodic aluminum oxide membrane as-prepared contained a well-ordered array of through-hole pores 50 nm in diameter. The membranes themselves were used as catalysts and essential parts for filters for purification of water, beverages and food, and hemodialysis and electrodialysis. Sometimes the surfaces and the pores of the membranes were coated with $TiO_2$, $V_2O_3$, WO, $SnO_2$, ZnO or any other ceramic oxide or polymeric adsorbent and/or catalytic materials by using sputtering, evaporation, electrodeposition or sol-gel methods. The coated membrane was used for gas purification filters and photo catalytic filters to remove fine dust and environmentally harmful gas species such as VOC, $NO_x$, $SO_x$, dioxins, $CO_2$, CO, microbiological substances and so on.

Example 2

Aluminum ingot with a purity of 99.9% were prepared and machined to a hollow cylinder of 100 mm inner diameter, 300 mm outer diameter and a length of 500 mm. The hollow cylinder was drawn to a hollow fiber of 50 µm inner diameter, 110 µm outer diameter and 5000 mm in length, cut into 100 mm long pieces, and electropolished to a fine surface. Then the hollow fibers were anodized in a way similar to that described in example 1. The nanoporous anodic aluminum oxide hollow fiber as-prepared contained a well-ordered array of through-hole pores 50 nm in diameter on its wall. The hollow fiber membranes themselves were used as catalysts. Also they were used for the fabrication of filters consisting of a bundle of hollow fiber membranes for purification of water, beverages and food, and for hemodialysis and electrodialysis. Sometimes the pores of the membrane were coated with $TiO_2$, $V_2O_3$, WO, $SnO_2$ or ZnO by using evaporation, electrodeposition or sol-gel methods. The coated membrane was used for water and gas purification filters and photo catalytic filters with very high efficiency.

Example 3

Aluminum alloy ingots containing a small amount of Cu, Mn, Si, Mg, Cr, Zn, Zr, Ti, Li, Mg—Si or Mg—Si—Cr were prepared. The small amount of metal element was added for enhancement of the mechanical properties of aluminum. The alloy ingots were used for fabricating aluminum tubes and hollow fibers by using the procedure described in examples 1 and 2. The aluminum tubes and hollow fibers were electropolished and then anodized to nanoporous alumina membranes by using the method similar to that described in example 1.

Example 4

Figure 4:
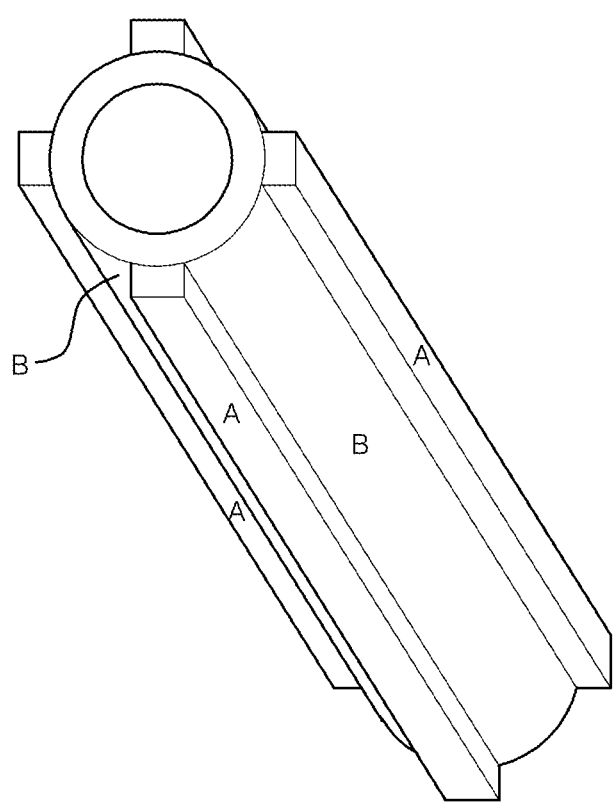
FIG. 4 shows an aluminum or titanium tube with four protruded rectangular bars along the z-direction on the outer wall of the tube in four-fold symmetry, in which A denotes the protruded rectangular bar designed for a support and a joint, and B a thin layer region to be anodized.
Figure 5:
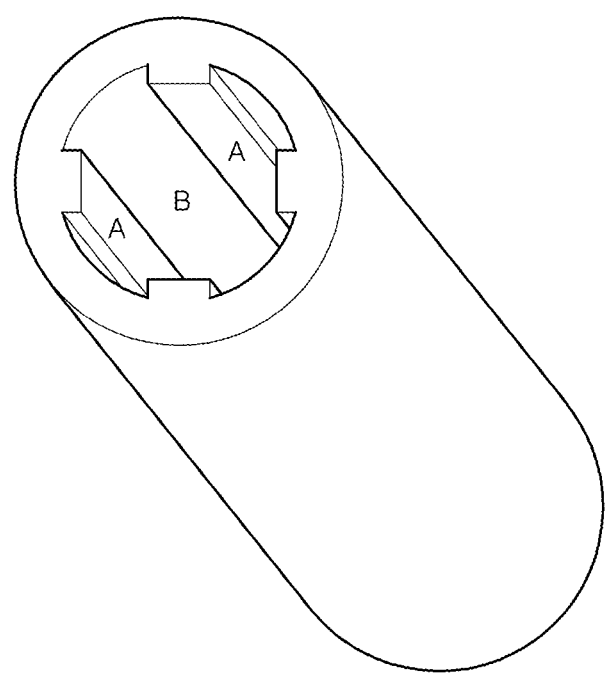
FIG. 5 shows an aluminum or titanium tube with four protruded rectangular bars along the z-direction on the inner wall of the tube in four-fold symmetry, in which A denotes the protruded rectangular bar designed for a support and a joint, and B a thin layer region to be anodized.
Figure 6:
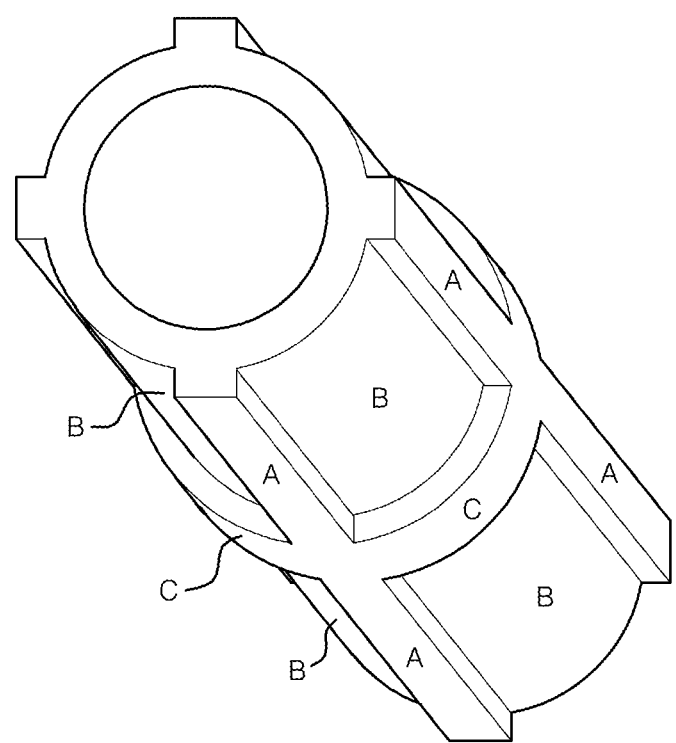
FIG. 6 shows an aluminum or titanium tube with four protruded rectangular bars along the z-direction in four-fold symmetry and another protruded rectangular bar along the circumferential direction on the center of the outer wall of the tube, in which A and C denote a protruded bar region designed for a support and a joint, and B a thin layer region to be anodized.
Figure 7:
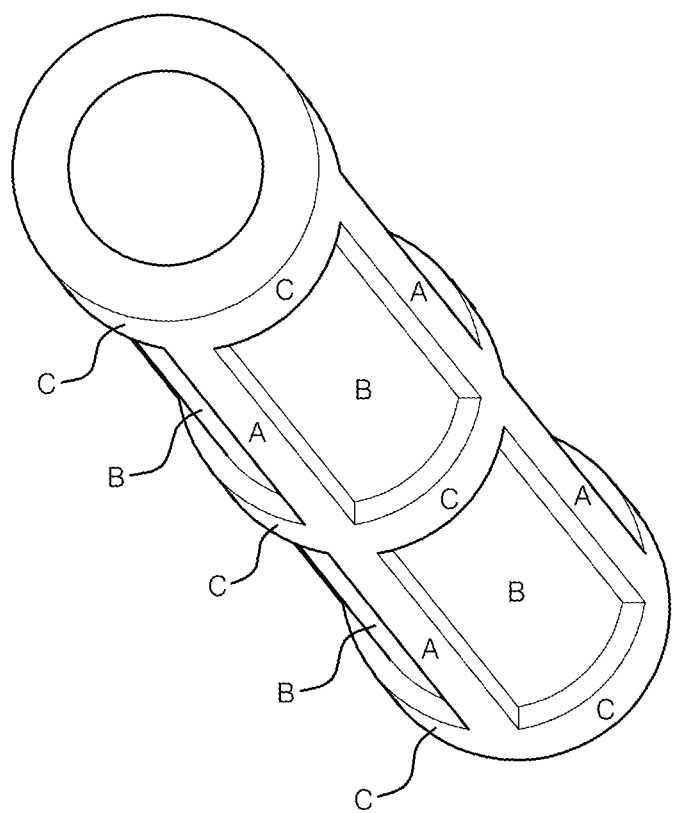
FIG. 7 shows an aluminum or titanium tube with four protruded rectangular bars along the z-direction in four-fold symmetry and another three protruded rectangular bars along the circumferential direction on the center and both the ends of the outer wall of the tube, in which A and C denote a protruded bar region designed for a support and a joint, and B a thin layer region to be anodized.

Aluminum alloy ingots containing a small amount of one of the single, binary or ternary alloying elements listed in example 3 were prepared. The ingots were machined to hollow cylinders of 100 mm inner diameter, 120 mm outer diameter and a length of 500 mm. Here the thickness of the tubes varied with circumferential position. Then the tubes were drawn to tubes in which the thickness varies periodically with circumferential position, so that the thicker portions may be arranged with certain symmetry around the circle. An example of such tubes with periodically different thicknesses arranged around the circle is shown in FIG. 4. The example has four protruded portions in a four-fold symmetry. Also tubes with higher-fold symmetry could be prepared. The protruded thick parts in the figure were designed for use as a support and a joint for connecting to neighboring structures if they were covered with masks during anodization and thus were not anodized. Of course, the protruded parts could be located in the inner wall, as shown in FIG. 5, or in both the inner and the outer walls. Also protruded parts with other shapes could be made as shown in FIGS. 6 and 7 by using welding, lamination or riveting methods, for strengthening the membrane in other directions. While the protruded parts denoted by "A" in FIGS. 4 to 7 are supports strengthening the membrane in a z-axis direction, those denoted by "c," lying along a circumferential direction in FIGS. 6 and 7 support strengthening the membrane along a circumferential direction. Also aluminum alloy tubes with protruded parts of square or rectangular shapes at both ends, which are designed for forming excellent connections to neighboring anodic alumina membranes, could be prepared.

Then the tube with protruded parts was electropolished and then anodized by using a procedure similar to that described in example 1, until thin tube walls were thoroughly anodized and the pores in a thin wall were grown up to the surface of the opposite wall. In order to fabricate excellent alumina membranes of this kind of shape, special care should be taken to make excellent thermal contact between the objects to be anodized and the heat sink. Sometimes the protruded parts which are desired to be used as joints were covered with masks to prevent them from being anodized. Of course the pores could be grown either inward or outward, depending on the anodization set-up used. The oxide film formed on the surfaces of thick protruded parts can play the role of protecting against acidic or alkaline circumstances. However, to use the protruded parts as joints for connecting to neighboring structures by various methods including welding, the protruded parts could be covered by a coat before anodization to prevent the coated part from being anodized, the coat being removed after anodization.

Example 5

Hollow cylinders of 5 mm thick aluminum alloy were prepared by drawing or machining. Then the tubes of shapes shown in FIGS. 4 to 7 were fabricated using the following two methods. The first such method uses a lithography technique, wherein after making a thin tube 5 mm thick, the inner or outer wall surfaces of the parts which would remain thick, such as surfaces denoted "A" and "C" in FIGS. 4 to 7, were coated with photoresist. Then the whole surface was exposed to ultraviolet light and then etched until the aimed thickness for the thin part, ca. 500 µm, was obtained. The etched tube was electropolished and then anodized using the procedure similar to that described in example 1. Sometimes the etched tube was anodized after removing the photo mask, in order to make the surfaces of protruded parts resistant against acidic and alkaline environments.

The second method is machining or scratching out some portions from the inner or outer walls to a certain depth to make the shapes shown in FIGS. 4 to 7.

Next, the etched, machined or scratched tube was anodized by using a procedure similar to that of example 1 until through-hole pores formed throughout the tube wall.

Example 6

Aluminum alloy tubes 5 mm thick were prepared by drawing or machining. The inner or outer walls of the tubes were patterned using lithography, machining or scratching methods. The pattern shape can be changed depending on the design and purpose of the membrane. The patterned tubes were electropolished and then anodized by using a similar method to that described in example 1. The photoresist can be removed before or after anodization.

Example 7

Figure 8:
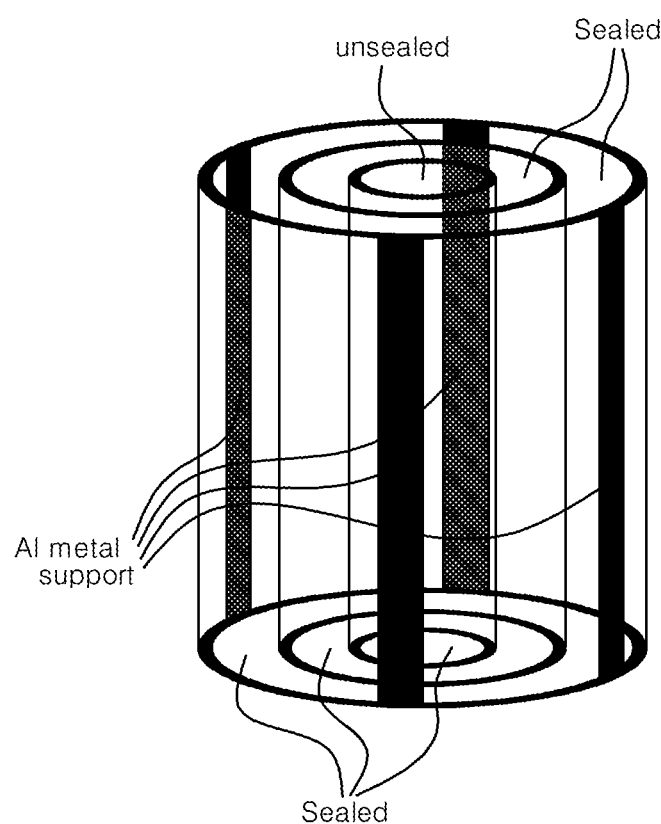
FIG. 8 shows a cylindrical stack of three tubes of nanoporous anodic oxide ceramic membranes with different diameters, which have four protruded bars lying along z-axis direction in four-fold symmetry with respect to a concentric axis, in which both upper and lower ends of all the cylinders except for the upper end of the cylinder with the smallest diameter are sealed.

Three aluminum alloy tubes 5 mm thick with different inner and outer diameters were prepared by drawing or machining. The inner and outer diameters of each tube were adjusted to fit for adjoining the tubes in a parallel stack with a concentric axis by welding, riveting or screwing. The tubes with different inner and outer diameters were patterned to result in the shape of FIG. 7. The tubes were anodized using different electrolytes and potentials corresponding to the electrolytes used, to fabricate tubular membranes with different interpore distances, by using methods similar to those described in example 1. Then the anodized tubes were treated in a phosphoric acid solution to widen the pores and thus to obtain high porosity. The resulting membranes had different pore diameters but almost same porosity. The resulting tubes have larger pore diameters with increasing tube diameter. The pore diameters, for example, were 200, 50 and 10 nm in 200, 100 and 50 mm ID tubes, respectively. Then the tubes were assembled into a cylinder stack with a concentric axis as shown in FIG. 8. The cylinder stacks were used as filters for purification of water, beverages and food, and for hemodialysis and electrodialysis, after the surface and the pore channels were functionalized in a certain manner.

Sometimes the protruded parts of the tubes were covered by a coat to prevent the parts from being deposited. Then the surfaces of the tubular membranes were coated with $TiO_2$, $V_2O_3$, WO, $SnO_2$ or ZnO by using sputtering, evaporation, electrodeposition or sol-gel methods. Then the tubes coated with oxide adsorbents or catalysts were assembled as a cylindrical stack with a common central axis. The stacks of cylinder membranes was used for gas purification filters and photo catalytic filters to remove fine dust and environmentally harmful gas species such as VOC, $NO_x$, $SO_x$, dioxins, $CO_2$, CO, etc.

Here the stacks of cylinder membranes could be consisted of many tubes, each or a set of which can filter a specific gas species. Therefore, the stack of cylinder membranes could be used as multi-functional filter which can filter several gas species.

Example 8

An aluminum alloy ingot containing small amounts of Cu, Mn, Si, Mg, Cr, Zn, Zr, Ti, Li, Mg—Si or Mg—Si—Cr was prepared and machined to a hollow cylinder. The hollow cylinder was drawn to a hollow fiber of 1 mm inner diameter, 2 mm outer diameter and 5000 mm in length, and cut into pieces 100 mm long. The hollow fibers were patterned and etched to a shape shown in FIG. 7. The hollow fibers were electropolished and then anodized in a way similar to that described in example 1.

Figure 9:
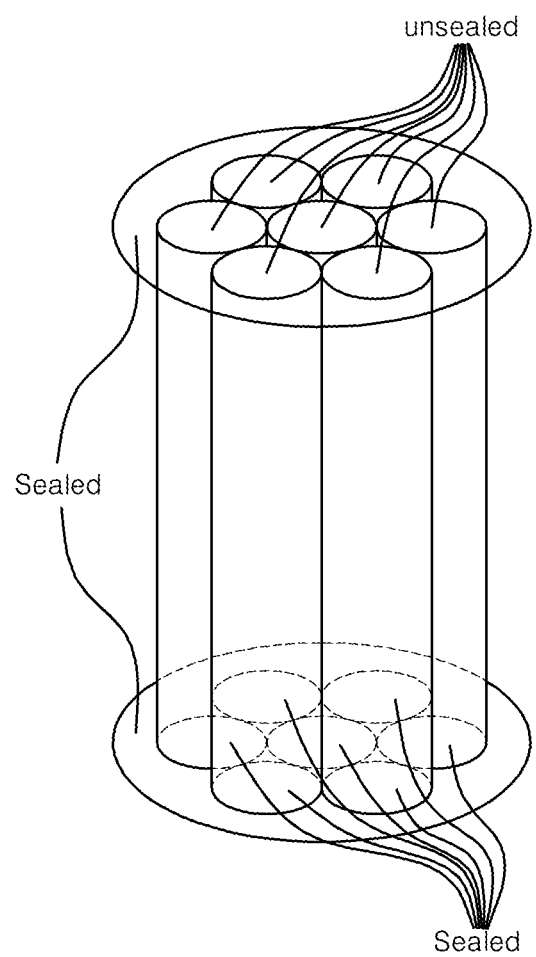
FIG. 9 shows a bundle consisting of seven hollow cylinders of nanoporous anodic oxide ceramic membranes, in which the lower ends of all the cylinder membranes are sealed while the upper ends are open.

Then the surfaces and the pores of some fibers were coated with $TiO_2$, $V_2O_3$, WO, $SnO_2$ or ZnO by using evaporation, electrodeposition, sol-gel or any other coating methods. The uncoated or coated hollow fibers were assembled to a bundle of hollow fibers as shown in FIG. 9. The bundle was used for purification of water, beverages, food, chemicals and gas, and hemodialysis and electrodialysis.

Example 9

Aluminum alloy tube 50 mm inner diameter, 51 mm outer diameter, 100 mm in length were electropolished to 400 µm thick and then anodized using the procedures of examples 1. The membranes were heat-treated at high temperatures to be converted stable alumina crystalline phase. Then slurry or slip containing nanoscale $TiO_2$ was coated, dried for 24 hr and heattreated at an elevated temperature in a special atmosphere at which high fraction of (001) planes of anatase phase can result in. The resulting $TiO_2/Al_2O_3$ composite membranes were used in electro filtration and so on, in which thermally and chemically stable membranes with special functionality like photo catalysis or $NO_x$ adsorption were required.

Example 10

Titanium or titanium alloy tube 50 mm inner diameter, 51 mm outer diameter, 100 mm long were electropolished to 400 µm thick and then anodized using the procedure similar to that of aluminum oxide as described example 1, except that a different electrolyte may be used. As-prepared nanoporous anodic titania membrane tubes were used for fabrication of filters of shapes shown in FIGS. 8 and 9 for filtering $NO_x$, $SO_x$, VOC, etc.

Example 11

Titanium or titanium alloy tube 50 mm inner diameter, 51 mm outer diameter, 100 mm long were electropolished to 400 µm thick and then its inner or outer surface was coated with a thin layer of aluminum. The aluminum coated titanium (alloy) tube was anodized using the procedure similar to that described in example 1, until the entire aluminum layer and some of the outer or the inner layer of titanium tube was anodized. Then the anodized one was etched until the anodized alumina layer was removed. As a result, the surface of titanium slightly anodized, which contained a pattern as seed for next anodization, was obtained. Then the remaining titanium was anodized by using the procedure similar to that of aluminum oxide as described example 1, except that a different electrolyte may be used.

While the present invention has been described with reference to the particular illustrative embodiments and examples as described above, it is not to be restricted by the embodiments and examples but only by the appended claims. It is to be appreciated that those skilled in the art can change or modify the embodiments without departing from the scope and spirit of the present invention.

What is claimed is:

1. A method of producing a nanoporous oxide ceramic membrane comprising:
    providing a metallic tube in a tubular or hollow fiber shape of predetermined dimension;
    placing a cathode inside the metallic tube in cylindrical symmetry to each other;
    placing a heat sink in contact or in close contact with an outer wall of the metallic tube so as to sufficiently absorb heat generated during anodization and to make the anodization process proceed in a steady state;
    filling an electrolyte to soak an inner wall surface of the metallic tube and the cathode with the electrolyte; and
    anodizing the metallic tube to produce a nanoporous oxide ceramic membrane, said anodizing performed by applying electric current between the metallic tube as an anode and the cathode while absorbing heat produced during the anodization from the outer wall of the metallic tube via the heat sink,
    wherein said anodizing is performed such that a portion of the wall from the inner wall of the metallic tube is anodized, and
    wherein the method further comprises: etching, after said anodizing, the inner or outer wall of the metallic tube; and, further anodizing a remaining non-anodized portion of the wall of the metallic tube so as to anodize an entire wall of the metallic tube between the outer wall and inner wall of the metallic tube.

2. A method of producing a nanoporous oxide ceramic membrane comprising:
    providing a metallic tube in a tubular or hollow fiber shape of predetermined dimension;
    placing a cathode inside the metallic tube in cylindrical symmetry to each other;
    placing a heat sink in contact or in close contact with an outer wall of the metallic tube so as to sufficiently absorb heat generated during anodization and to make the anodization process proceed in a steady state;
    filling an electrolyte to soak an inner wall surface of the metallic tube and the cathode with the electrolyte; and
    anodizing the metallic tube to produce a nanoporous oxide ceramic membrane, said anodizing performed by applying electric current between the metallic tube as an anode and the cathode while absorbing heat produced during the anodization from the outer wall of the metallic tube via the heat sink,
    wherein said anodizing is performed such that a portion of the wall from the inner wall of the metallic tube is anodized, and
    wherein the method further comprises: imprinting performed after said anodizing, on the inner or outer wall of the metallic tube; and, further anodizing a remaining non-anodized portion of the wall of the metallic tube so as to anodize an entire wall of the metallic tube between the outer wall and inner wall of the metallic tube.

3. The method of claim 1, wherein the metallic tube is made of high purity grade aluminum or low purity grade aluminum, or aluminum alloy containing one to four metal elements selected from the group consisting of Cu, Mn, Si, Mg, Cr, Zn, Zr, Ti and Li elements, or is made of titanium or titanium alloy.

4. The method of claim 2, wherein the metallic tube is made of high purity grade aluminum or low purity grade aluminum, or aluminum alloy containing one to four metal elements selected from the group consisting of Cu, Mn, Si, Mg, Cr, Zn, Zr, Ti and Li elements, or is made of titanium or titanium alloy.

5. A method of producing a nanoporous oxide ceramic membrane comprising:
    providing a metallic tube in a tubular or hollow fiber shape of predetermined dimension;
    placing a cathode inside the metallic tube in cylindrical symmetry to each other;
    placing a heat sink in contact or in close contact with an outer wall of the metallic tube so as to sufficiently absorb heat generated during anodization and to make the anodization process proceed in a steady state;
    filling an electrolyte to soak an inner wall surface of the metallic tube and the cathode with the electrolyte; and
    anodizing the metallic tube to produce a nanoporous oxide ceramic membrane, said anodizing performed by applying electric current between the metallic tube as an anode and the cathode while absorbing heat produced during the anodization from the outer wall of the metallic tube via the heat sink,
    wherein the membrane comprises thick protruded parts acting as supports for mechanical strengthening and joints for connecting with another neighboring structure, and thin layers with nanopores of 1 to 300 nm in size, and
    wherein the protruded parts are provided by performing a lithography process which comprises: coating a portion of the inner or outer walls of the metallic tube with photoresist, followed by exposing to ultraviolet light and etching to provide a shape of the protruded parts before performing said anodizing the metallic tube.

6. The method of claim 5, wherein the metallic tube is made of high purity grade aluminum or low purity grade aluminum, or aluminum alloy containing one to four metal elements selected from the group consisting of Cu, Mn, Si, Mg, Cr, Zn, Zr, Ti and Li elements.

7. The method of claim 5, wherein the metallic tube is made of titanium or titanium alloy and the membrane is produced by anodizing using an electrolyte selected from the group consisting of HF, KF, NaF, and a mixed solution of $H_2SO_4$ and HF, $CrO_3$ and HF, $(NH_4)_2SO_4$ and $NH_4F$, and $(NH_4)_2SO_4$ and NaF.

* * * * *